United States Patent
Kim et al.

(10) Patent No.: US 7,933,262 B2
(45) Date of Patent: Apr. 26, 2011

(54) METHOD AND SYSTEM FOR PROVIDING INTEGRATION THEME PACK SERVICE

(75) Inventors: Jongbae Kim, Seoul (KR); Hoojong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 762 days.

(21) Appl. No.: 11/909,899

(22) PCT Filed: Sep. 7, 2006

(86) PCT No.: PCT/KR2006/003562
§ 371 (c)(1),
(2), (4) Date: Sep. 27, 2007

(87) PCT Pub. No.: WO2007/029976
PCT Pub. Date: Mar. 15, 2007

(65) Prior Publication Data
US 2008/0192714 A1    Aug. 14, 2008

(30) Foreign Application Priority Data
Sep. 7, 2005    (KR) .................. 10-2005-0083321

(51) Int. Cl.
*H04L 12/66* (2006.01)
(52) U.S. Cl. ......................... 370/353; 455/566
(58) Field of Classification Search .......... 370/328, 370/353; 455/566
See application file for complete search history.

(56) References Cited

U.S. PATENT DOCUMENTS

| | | | |
|---|---|---|---|
| 6,909,878 B2 | 6/2005 | Haller et al. | |
| 7,636,889 B2 | 12/2009 | Weber et al. | |
| 2003/0200278 A1 | 10/2003 | Youn et al. | |
| 2004/0220943 A1* | 11/2004 | Ross et al. | 707/100 |
| 2006/0014493 A1* | 1/2006 | Haller et al. | 455/41.3 |
| 2006/0025132 A1 | 2/2006 | Karaoguz et al. | |
| 2007/0038934 A1 | 2/2007 | Fellman | |

FOREIGN PATENT DOCUMENTS

| KR | 10-2004-0097642 | 11/2004 |
|---|---|---|
| KR | 10-2004-0006883 | 12/2004 |
| KR | 10-2002-0001979 | 10/2006 |

OTHER PUBLICATIONS

Chinese Office Action for 200680023773.5.

* cited by examiner

*Primary Examiner* — Seema S Rao
*Assistant Examiner* — Sai-Ming Chan
(74) *Attorney, Agent, or Firm* — Lowe Hauptman Ham & Berner LLP (57) ABSTRACT

Disclosed is a method and system for providing an integration theme pack service in which, if a user receives an integration theme pack content from a content-providing server through a mobile communication terminal, the mobile communication terminal changes a background screen image into the integration theme pack content, employs the integration theme pack content as a background picture, and generates and displays a user interface having a menu configuration image formed on the integration theme pack content in a dual transparent structure.

9 Claims, 6 Drawing Sheets

METHOD AND SYSTEM FOR PROVIDING INTEGRATION THEME PACK SERVICE

CROSS REFERENCE TO RELATED APPLICATION

This application is the National Phase application of International Application No. PCT/KR2006/003562, filed Sep. 7, 2006, which designates the United States and was published in English. This application, in its entirety, is incorporated herein by reference.

TECHNICAL FIELD

The present invention relates to a method and a system for providing an integration theme pack service. Specifically, the present invention relates to a method and system for providing an integration theme pack service in which, if a user receives an integration theme pack content from a content-providing server through a mobile communication terminal, the mobile communication terminal changes a background screen image into the integration theme pack content, employs the integration theme pack content as a background picture, and generates and displays a user interface having a menu configuration image formed on the integration theme pack content in a dual transparent structure.

BACKGROUND ART

Information communication technology, in which the Internet and mobile communication are the representative, has changed the life pattern of modern people. Personal Computers capable of accessing the Internet have been spread to most homes, schools and offices, so that information acquisition through web sites, product purchase through E-commerce, news exchange through E-mail, etc., have been implemented.

Only a few years ago, people could use only a mobile communication service mainly for voice communication by using a mobile communication terminal. However, recently, a wireless Internet service has emerged, which can provide a mobile communication terminal with a data communication service using the Internet.

With the development of a mobile communication service as described above, a mobile communication terminal has also evolved into a mobile communication terminal equipped with various devices such as camcorders, cameras and MP3 players from an early cellular phone mainly for voice communication. As a mobile communication terminal has various devices therein, the display device of the mobile communication terminal has also developed into a color display device from a black and white display device. Generally, the display device of a mobile communication terminal exists in order to inform a user of various state information of the mobile communication terminal, e.g. information such as the power supply level, the reception intensity of radio waves, and date and time. As described above, with the development of information communication technology, a mobile communication terminal equipped with a color display device has been spread and a wireless Internet service has been generally used, which has resulted in the emergence of various content-providing businesses. Nowadays, a content-providing business (so called, a coloring service) has been highlighted, which provides still pictures and/or moving pictures to a mobile communication terminal in a communication standby state. A user interface displayed on a mobile communication terminal includes a background screen image and a menu configuration image. In a conventional coloring service, when a user uses the coloring service, a background screen image and a menu configuration image are integrally set and displayed by still pictures and/or moving pictures provided by a content provider. Therefore, a user cannot randomly configure a background screen image and a menu configuration image according to the preference of the user.

DISCLOSURE OF THE INVENTION

Therefore, the present invention has been made in view of the above-mentioned problems, and it is an object of the present invention to provide a method and system for providing an integration theme pack service in which, if a user receives an integration theme pack content from a content-providing server through a mobile communication terminal, the mobile communication terminal changes a background screen image into the integration theme pack content, employs the integration theme pack content as a background picture, and generates and displays a user interface having a menu configuration image formed on the integration theme pack content in a dual transparent structure.

According to one aspect of the present invention, there is provided a system for providing an integration theme pack service, which customizes a user interface displayed on a mobile communication terminal according to a preference of a user, in a mobile communication system including a wireless access network and a mobile communication network, the wireless access network being a ground-based infrastructure for wirelessly exchanging data with the mobile communication terminal based on a predetermined protocol, having handoff and radio resource management functions, and relaying the integration theme pack service in which the user interface of the mobile communication terminal is changeable according to the preference of a user, the mobile communication network being a set of communication equipment for providing voice telephone and data exchange services to a plurality of subscribers through a switching center, and relaying the integration theme pack service to the mobile communication terminal, the system including a content-providing server for providing the mobile communication terminal with an integration theme pack content necessary for using the integration theme pack service.

According to another aspect of the present invention, there is provided a method for providing an integration theme pack service, which customizes a user interface displayed on a mobile communication terminal according to a preference of a user, in a system including a wireless access network, a mobile communication network and a content-providing server, the wireless access network being a ground-based infrastructure for wirelessly exchanging data with the mobile communication terminal based on a predetermined protocol, having handoff and radio resource management functions, and relaying the integration theme pack service in which the user interface of the mobile communication terminal is changeable according to the preference of a user, the mobile communication network being a set of communication equipment for providing voice telephone and data exchange services to a plurality of subscribers through a switching center, and relaying the integration theme pack service to the mobile communication terminal, the content-providing server providing the mobile communication terminal with an integration theme pack content necessary for using the integration theme pack service, the method comprising the steps of: (a) accessing the content-providing server; (b) downloading an interface manager from the content-providing server, the interface manager being a platform necessary for using the integration theme pack service; (C) receiving list information about the integration theme pack content so as to generate the integration theme pack content; (d) downloading the integration theme pack content; and (e) installing the downloaded integration theme pack content.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiment of the present invention. It should be noted that the similar components are designated by similar reference numerals although they are illustrated in different drawings. Also, in the following description, a detailed description of known functions and configurations incorporated herein will be omitted when it may obscure the subject matter of the present invention.

Figure 1:
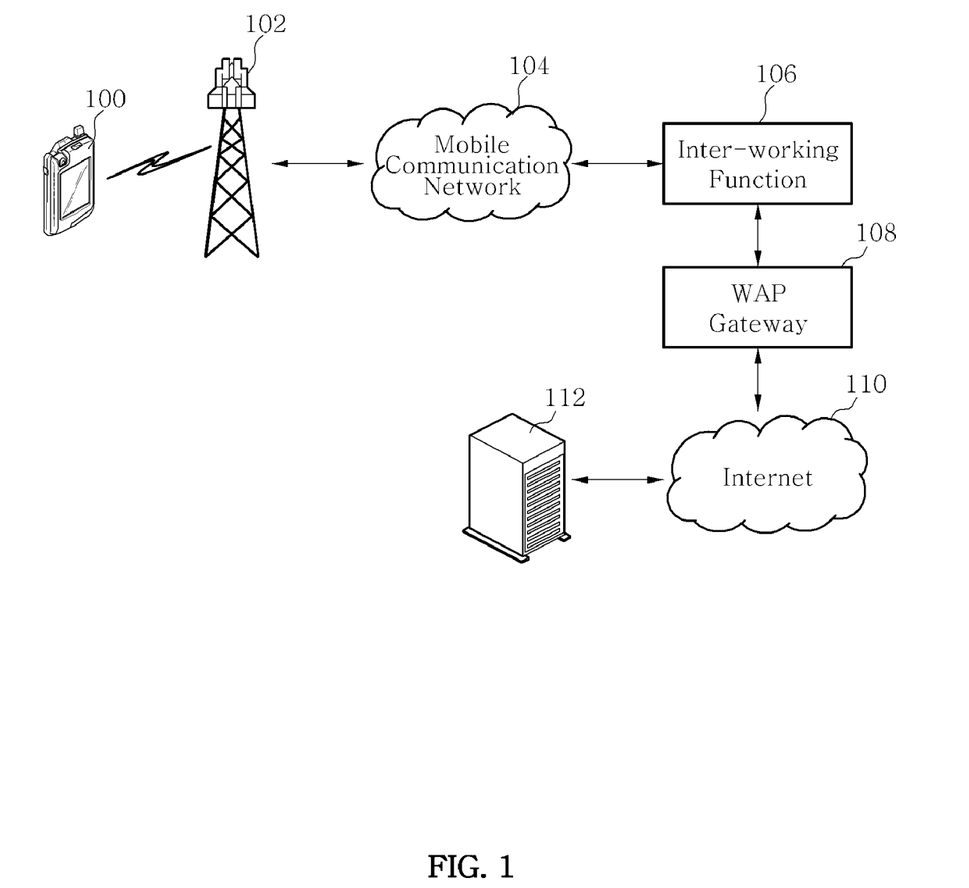
FIG. 1 is a block diagram schematically illustrating a system for providing an integration theme pack service according to a preferred embodiment of the present invention.

FIG. 1 is a block diagram schematically illustrating a system for providing an integration theme pack service according to a preferred embodiment of the present invention.

The system for providing the integration theme pack service according to the preferred embodiment of the present invention includes a mobile communication terminal 100, a wireless access network 102, a mobile communication network 104, an inter-working function 106, a WAP gateway 108, the Internet 110, a content-providing server 112, among others.

In the following description, for convenience of description, a mobile communication service will be defined as an integration theme pack service, in which, if a user accesses the content-providing server 112 by using the mobile communication terminal 100, selects a genre (e.g. entertainers, movies, landscapes, objects, etc.) according to the preference of the user, and then downloads an integration theme pack content including a background screen image, ringing tone, effect sound, etc., according to the selected genre, the mobile communication terminal 100 changes the background screen image of the user interface being currently displayed into the downloaded integration theme pack content, employs the integration theme pack content as a background picture, overlaps the integration theme pack content with a menu configuration image, and generates and displays a user interface having the overlapping portion transparently processed.

In the present invention, the integration theme pack service has main characteristics in that, if a user accesses the content-providing server 112 by using the mobile communication terminal 100 and then selects a favorite genre from the content-providing server 112, the integration theme pack content of the corresponding genre including a background screen image, ringing tone, effect sound, etc., is downloaded so as to customize the user interface of the mobile communication terminal 100. The integration theme pack content is provided as a finished product by a content provider through the content-providing server 112.

The mobile communication terminal 100 denotes a communication terminal capable of using a web service in wire/wireless communication environments. That is, the mobile communication terminal 100 denotes a communication terminal having an interface manager that is an application necessary for using the integration theme pack service, and receiving the integration theme pack content from the content-providing server 112. In other words, the mobile communication terminal 100 denotes a communication terminal capable of accessing the mobile communication network 104 via the wireless access network 102, providing a voice communication function for performing typical voice communication with another mobile communication terminal in a wireless manner, and customizing a user interface by using the integration theme pack content provided from the content-providing server 112.

The mobile communication terminal 100 accesses the Internet 110 via the mobile communication network 104 by using an Internet access browser such as a Wireless Application Protocol (WAP), which is an Internet access protocol, a Microsoft Internet Explorer (MIE) based on a HTML using a Hyper Text Transfer Protocol (HTTP), a Handheld Device Transport Protocol (HDTP), an i-mode of NTT DOCOMO, Inc., and a "NATE" of SK Telecom Co., Ltd., and interworks with the content-providing server 112 connected to the Internet 110. From among the Internet access protocols used by the mobile communication terminal 100, the MIE uses a language referred to as an m-HTML obtained by slightly modifying and abbreviating the HTML, and the i-mode uses a language referred to as a compact HTML (c-HTML) corresponding to the subset of the HTML.

The wireless access network 102 denotes a network endpoint equipment performing processing of baseband signals, wire/wireless conversion, transmission/reception of radio signals, etc., and is directly connected to the mobile communication terminal 100. That is, the wireless access network 102 is arranged by the cell, and transmits a communication request of the mobile communication terminal 100 existing in a cell area controlled by the wireless access network 102 to the mobile communication network 104, or performs position information registration for becoming aware of the position of the mobile communication terminal 100 existing in the cell area controlled by the wireless access network 102.

Further, the wireless access network 102 performs a relaying operation between the content-providing server 112 and the mobile communication terminal 100, and performs wireless channel assignment and release, determination of inter-cell soft handoff or hard handoff for the mobile communication terminal 100, transcoding and vocoding, Global Positioning System (GPS) clock distribution, management and maintenance for a base station, etc.

The mobile communication network 104 corresponds to a public switched telephone network managed by a mobile communication provider, denotes a set of communication equipment providing multiple unspecified subscribers with a voice telephone service or a data exchange service, and provides the mobile communication terminal 100 with a CDMA-2000 service, a WCDMA-2000 service, a portable Internet service, etc. The mobile communication network 104 performs processing of basic and supplementary services, processing of incoming and originating calls of a subscriber, processing of position registration and handoff procedures, an interworking function with another network, subscription and subscription release for the integration theme pack service, etc. The mobile communication network 104 of an IS-95 A/B/C system includes a subsystem such as an Interconnection Network Subsystem (INS) for performing a distributed call processing function, a Central Control Subsystem (CCS) for taking charge of a centralization function of operation and preservation, and a Location Registration Subsystem (LRS) for performing a storage and management function of information about mobile communication subscribers. Further, the mobile communication network 104 for 3 Generation (G) and 4G may include an Asynchronous Transfer Mode (ATM) switch (not shown) which improves transmission speed and the efficiency of a circuit use by transmitting packets by the cell.

The inter-working function 106 provides an interface for data exchange between a wireless communication system and a wired communication system, and converts protocols, signals and data in a form proper for each network. Generally, the inter-working function 106 connects the mobile communication network 104 to the Internet 110.

The WAP gateway 108 denotes software and hardware combined with the software for causing packet data to be wirelessly exchanged between the mobile communication terminal 100 and the content-providing server 112 via the mobile communication network 104. The WAP gateway 108 performs processing of communication code conversion or protocol conversion, etc., between the mobile communication network 104 and the Internet 110 in order to rapidly search for and display information on the Internet, thereby connecting the mobile communication network 104 to the Internet 110. That is, the WAP gateway 108 interconverts a WAP protocol and an Internet TCP/IP protocol. Accordingly, data transmission/reception is performed between the content-providing server 112 and the WAP gateway 108, which are connected to the Internet 110, through an HTTP protocol, and data exchange is performed between the mobile communication terminal 100 and the WAP gateway 108 through the WAP protocol. The WAP gateway 108 converts a website address request from the mobile communication network 104 into an HTTP request according to the WAP protocol, and then transmits corresponding website address request signals to the content-providing server 112 through the Internet 110 according to the HTTP protocol. Further, the WAP gateway 108 converts various HTML contents received from the content-providing server 112 into a binary code so that the mobile communication terminal 100 can recognize the content, and transmits the binary code to the mobile communication terminal 100. Herein, since data through the WAP gateway 108 is converted into a binary code, the amount thereof is reduced. Further, when the data is transmitted to the mobile communication network 104, the transmission load thereof is reduced.

In the above description, the WAP is the general term for a communication protocol enabling the use of the Internet 110 by using a wireless communication terminal such as the mobile communication terminal 100 and a personal digital assistant. In the WAP, data is converted into text codes on the Internet 110 and is then transferred to a wireless communication terminal, in order to solve the relatively slow communication speed problem of wireless communication. Further, the WAP is designed in consideration of a content and a wireless communication terminal, for which the WAP is to be used, so that users can use the Internet 110 only with a wireless terminal.

The Internet 110 denotes a communication network for providing an access path such that the mobile communication terminal 100 can transmit/receive packet data to/from the content-providing server 112.

The content-providing server 112 denotes software and hardware combined with the software for providing the integration theme pack service. That is, the content-providing server 112 provides a background screen image forming the user interface of the mobile communication terminal 100, employs the background screen image as a background picture, overlaps the menu configuration image of the mobile communication terminal 100 with the background screen image, and transparently displays the overlapping portion. In the present invention, the mobile communication terminal 100 can change the user interface according to the preference of a user, but does not completely change the background screen image and the menu configuration image forming the user interface. That is, the mobile communication terminal 100 changes the background screen image, ring tone, effect sound, etc., by using the integration theme pack content provided from the content-providing server 112, except for the menu configuration image.

Figure 2:
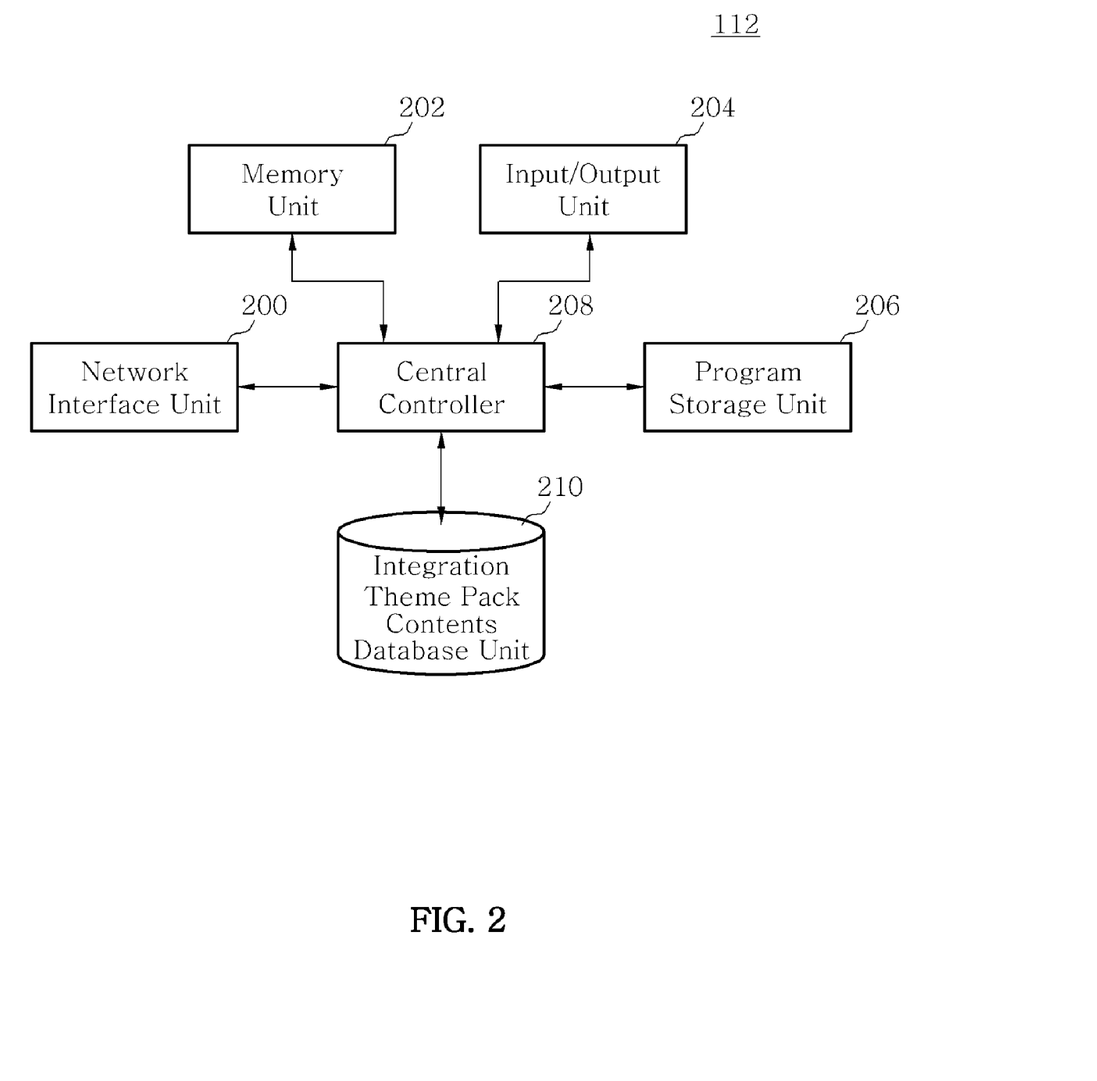
FIG. 2 is a block diagram schematically illustrating the internal construction of a content-providing server according to a preferred embodiment of the present invention.
Figure 3:
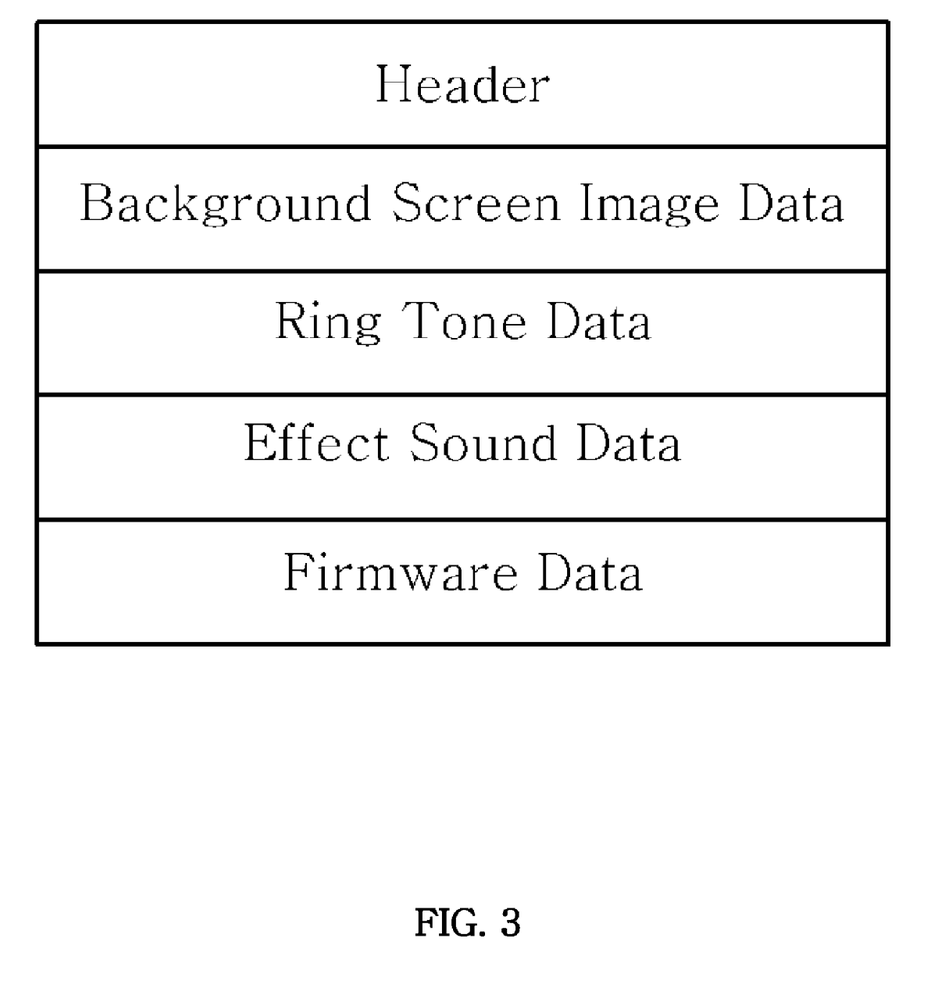
FIG. 3 is a diagram schematically illustrating an integration theme pack content stored in a content-providing server according to a preferred embodiment of the present invention.

FIG. 2 is a block diagram schematically illustrating the internal construction of the content-providing server according to the preferred embodiment of the present invention, and FIG. 3 is a diagram schematically illustrating the integration theme pack content stored in the content-providing server according to the preferred embodiment of the present invention.

The content-providing server 112 according to the preferred embodiment of the present invention includes a network interface unit 200, a memory unit 202, an input/output unit 204, a program storage unit 206, a central controller 208, an integration theme pack content database unit 210, etc.

In the present invention, the content-providing server 112 provides a background screen image, ring tone, effect sound, etc., which form the user interface of the mobile communication terminal 100, according to genres (e.g. entertainers, movies, landscapes, objects, etc.), and provides the mobile communication terminal 100 with an integration theme pack content including a background screen image, ring tone, effect sound, etc., corresponding to a predetermined genre if a user selects a favorite genre according to the preference of the user. Further, the content-providing server 112 provides the mobile communication terminal 100 with an interface manager that is an application necessary for using the integration theme pack service.

Still further, content-providing server 112 is configured to generate the integration theme pack content by using still pictures and/or moving pictures uploaded from the mobile communication terminal 100, the content-providing server 112 further configured to provide the mobile communication terminal 100 with the generated integration theme pack content.

The network interface unit 200 interworks with the Internet 110, etc., and provides the mobile communication terminal 100 requesting the integration theme pack service with a communication interface necessary for providing the integration theme pack content.

The memory unit 202 temporarily stores data processed by the central controller 208, or temporarily stores data generated in a process of providing the mobile communication terminal 100 with the integration theme pack service. The input/output unit 204 displays the present processing status regarding the providing of the integration theme pack service, etc., as well as the present processing status according to key input. The program storage unit 206 stores control software for executing a process of performing a service subscription procedure for the mobile communication terminal 100 intended for reception of the integration theme pack service and storing information of a user having completed the subscription procedure in the integration theme pack content database unit 210, a process of generating two or three-dimensional graphic list information used for selecting the integration theme pack content according to genres and providing the list information to the mobile communication terminal 100, a process of transmitting the selected integration theme pack content to the mobile communication terminal 100, etc.

The central controller 208 is a kind of central control unit, which controls a process by which the content-providing server 112 provides the integration theme pack service to the mobile communication terminal 100. That is, the central controller 208 executes the control software stored in the program storage unit 206, and transmits the integration theme pack content generated by the executed control software to the mobile communication terminal 100.

The integration theme pack content database unit 210 stores the interface manager that is software necessary for using the integration theme pack service, the integration theme pack content provided to the mobile communication terminal 100, etc. The integration theme pack content stored in the integration theme pack content database unit 210 includes a header, background screen image data, ring tone data, effect sound data, firmware data, etc., as illustrated in FIG. 3. The header denotes information about genres, and the background screen image data forms the background picture of the user interface of the mobile communication terminal 100. The ring tone data forms the ring tone of the mobile communication terminal 100, and the effect sound data forms the effect sound generated when the mobile communication terminal 100 executes an application.

Figure 4:
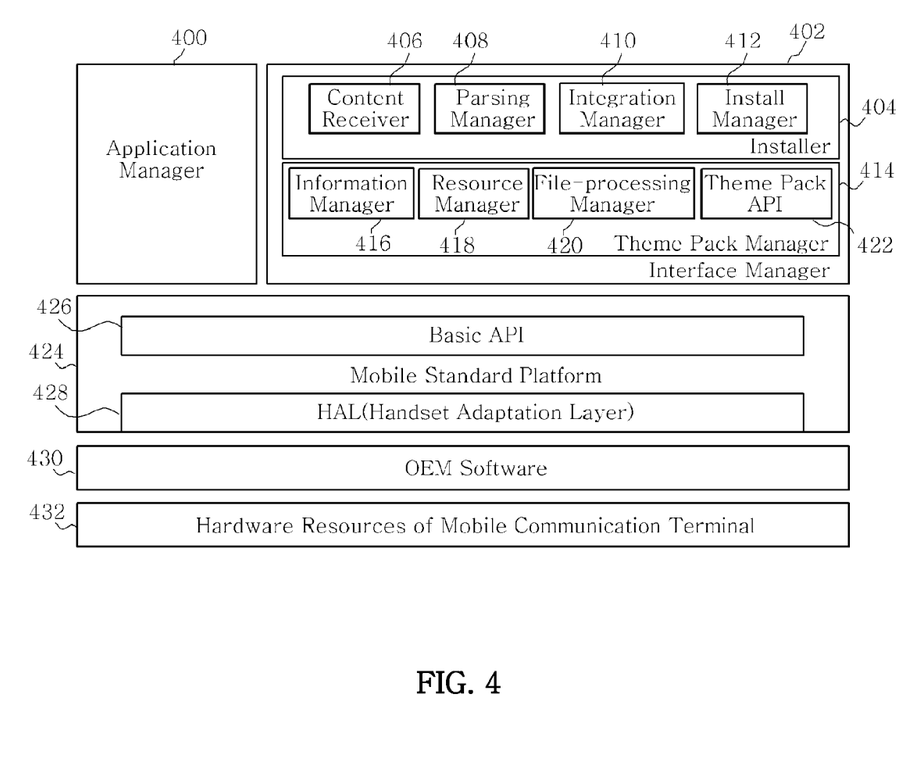
FIG. 4 is a diagram illustrating a WIPI platform structure applied to a mobile communication terminal capable of using a integration theme pack service according to a preferred embodiment of the present invention.

FIG. 4 is a diagram illustrating a WIPI platform structure applied to the mobile communication terminal capable of using the integration theme pack service according to the preferred embodiment of the present invention.

The WIPI platform structure according to the preferred embodiment of the present invention includes an application manager 400, an interface manager 402, a mobile standard platform 424, OEM software 430, hardware resources 432 of the mobile communication terminal, etc.

The application manager 400 denotes a software module for performing a function of downloading an interface manager 402 from the content-providing server 112, a function of installing the downloaded interface manager 402, a function of deleting the downloaded interface manager 402, etc., wherein the interface manager 402 is a software package necessary for using the integration theme pack service. When it is necessary to update an Application Programming Interface (API) and other elements constituting the interface manager 402, the application manager 400 adds or updates a necessary software module.

The interface manager 402 includes an installer 404 for installing the downloaded integration theme pack content in the mobile communication terminal 100, and a theme pack manager 414 for customizing a user interface by using the installed integration theme pack content. The interface manager 402 denotes a software module for performing a process of downloading the integration theme pack content from the content-providing server 112, and a process of decoding the downloaded integration theme pack content, employing the background screen image included in the integration theme pack content as a background picture, overlapping a menu configuration image with the background screen image, transparently processing the overlapping portion, and generating a user interface having employed ring tone and effect sound included in the integration theme pack content.

Hereinafter, a process by which a user uses the integration theme pack service will be described. First, the user operates a key input unit (not shown) provided in the mobile communication terminal 100 so as to execute the interface manager 402. The executed interface manager 402 separates the background screen image being displayed on a display unit (not shown) from the menu configuration image, and temporarily stores the separated background screen image and menu configuration image in the virtual area of a program storage unit (not shown). Then, the interface manager 402 extracts the background screen image from the integration theme pack content, temporarily stores the extracted background screen image in the virtual area of the program storage unit, and loads the menu configuration image previously separated and temporarily stored from the program storage unit. The interface manager 402 employs the extracted background screen image as the background picture, overlaps the menu configuration image with the background screen image, transparently processes the overlapping portion, generates the user interface having employed ring tone and effect sound included in the integration theme pack content, and displays the generated user interface on the display unit of the mobile communication terminal 100.

The installer 404 denotes a software module including a content receiver 406, a parsing manager 408, an integration manager 410, an install manager 412, etc. The content receiver 406 receives the downloaded integration theme pack content from the application manager 400, and the parsing manager 408 decodes the downloaded integration theme pack content. The integration manager 410 verifies the integrity of the downloaded integration theme pack content, and the install manager 412 stores the integration theme pack content, for which the integrity verification has been completed, in the program storage unit of the mobile communication terminal 100.

The theme pack manager 414 denotes a software module including an information manager 416, a resource manager 418, a file-processing manager 420, a theme pack API 422, etc. The information manager 416 confirms the genre information of the integration theme pack content stored in the program storage unit, and the resource manager 418 analyzes the hardware resources 432 of the mobile communication terminal to check an installation environment of the integration theme pack content. The file-processing manager 420 analyzes the currently displayed user interface to separate the background screen image and the menu configuration image therefrom, interworks with the resource manager 418 to temporarily store the separated background screen image and menu configuration image, decodes the background screen image included in the integration theme pack content so as to employ the background screen image as the background picture of the user interface, overlaps the menu configuration image with the background screen image, transparently processes the overlapping portion, and applies the ring tone, effect sound, etc. included in the integration theme pack content to the user interface. The theme pack API 422 calls a function providing a connection to the specific subroutine of a realtime processing operation system, which is provided in the mobile communication terminal 100, in order to run the integration theme pack content.

The mobile standard platform 424 denotes a software module including a basic API 426, a Handset Adaptation Layer (HAL) 428, etc. That is, the mobile standard platform 424 monitors the present use status of the hardware resources 432 of the mobile communication terminal, controls the use of the hardware resources 432 of the mobile communication terminal in a process of executing an application, and supports the execution and porting of various applications regardless of the type of the realtime processing operation system provided in the mobile communication terminal 100.

The basic API 426 denotes a software module used for communication with system software such as a realtime processing operation system and a database management system when an application such as the interface manager 402 is run according to the embodiment of the present invention. The basic API 426 is performed to call the function providing the connection to the specific subroutine of the realtime processing operation system, which is provided in the mobile communication terminal 100, in order to execute the interface manager 402.

The HAL 428 denotes a software module for supporting the standard of a platform for a terminal manufacturing company, and provides an interface between the hardware resources 432 of the mobile communication terminal and the realtime processing operation system. That is, the HAL 428 provides an environment in which the application manager 400 can be executed in a mobile communication terminal having different hardware constructions depending on manufacturing companies.

The OEM software 430 performs a basic voice call processing function, a data communication function of a lower layer, a text message transmission/reception function, a management function of the mobile communication terminal 100, etc. Further, if a control authority for the application manager 400 is received from the mobile standard platform 424, and then the integration theme pack content is received from the content-providing server 112, the OEM software 430 employs the background screen image included in the received integration theme pack content as the background picture of the user interface, overlaps the menu configuration image with the background screen image, and transparently processes the overlapping portion for display on the display unit. Herein, an SVD (CDMA Rel.A standard) has been ported in the OEM software 430 such that the interface manager 402 can smoothly operate in the mobile communication terminal 100.

The hardware resources 432 of the mobile communication terminal denote a set of electronic/mechanical devices such as the key input unit, the display unit, the program storage unit and the microprocessor of the mobile communication terminal 100.

That is, the mobile standard platform 424 controls the application manager 400 so as to install the interface manager 402 in the program storage unit, operates the installed the interface manager 402 to extract the background screen image included in the integration theme pack content, employs the extracted background screen image as the background picture, overlaps the menu configuration image with the background screen image, and transparently processes and displays the overlapping portion.

Figure 5:
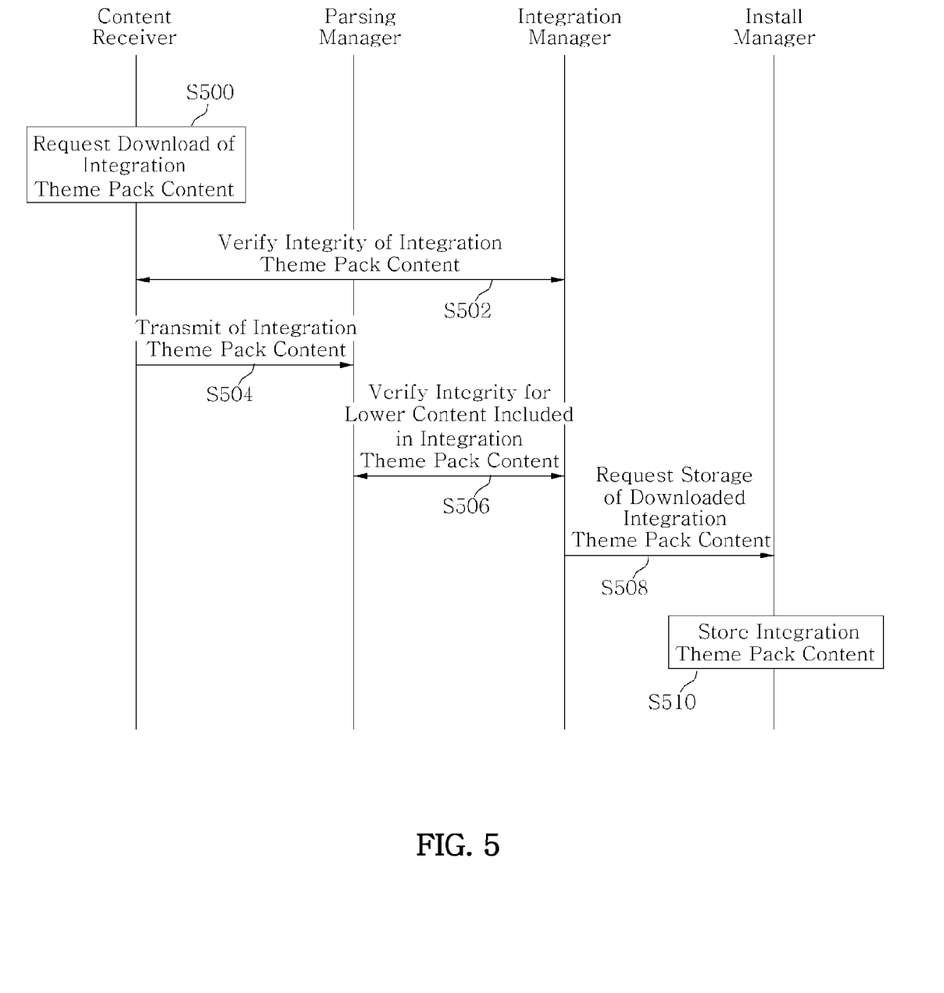
FIG. 5 is a ladder diagram illustrating a process of downloading an integration theme pack content according to a preferred embodiment of the present invention.

FIG. 5 is a ladder diagram illustrating a process of downloading the integration theme pack content according to the preferred embodiment of the present invention.

If a user operates the key input unit provided in the mobile communication terminal 100, accesses the content-providing server 112, selects the integration theme pack content, and then requests the download of the integration theme pack content, the application manager 400 stored in the mobile communication terminal 100 interworks with the content-providing server 112 to download the integration theme pack content (S500).

If the integration theme pack content is completely downloaded, the application manager 400 transfers the downloaded integration theme pack content to the content receiver 406. The content receiver 406 interworks with the integration manager 410 to verify the integrity of the downloaded integration theme pack content (S502). After having completed the integrity verification for the integration theme pack content, the content receiver 406 transmits the integration theme pack content to the parsing manager 408 (S504).

The parsing manager 408 analyzes the downloaded integration theme pack content, and verifies integrity for a lower content included in the integration theme pack content, i.e. a background screen image, ring tone, effect sound, etc. (S506). Then, the integration manager 410 requests the install manager 412 to store the downloaded integration theme pack content (S508), and the install manager 412 stores the downloaded integration theme pack content in the program storage unit (S510).

Figure 6:
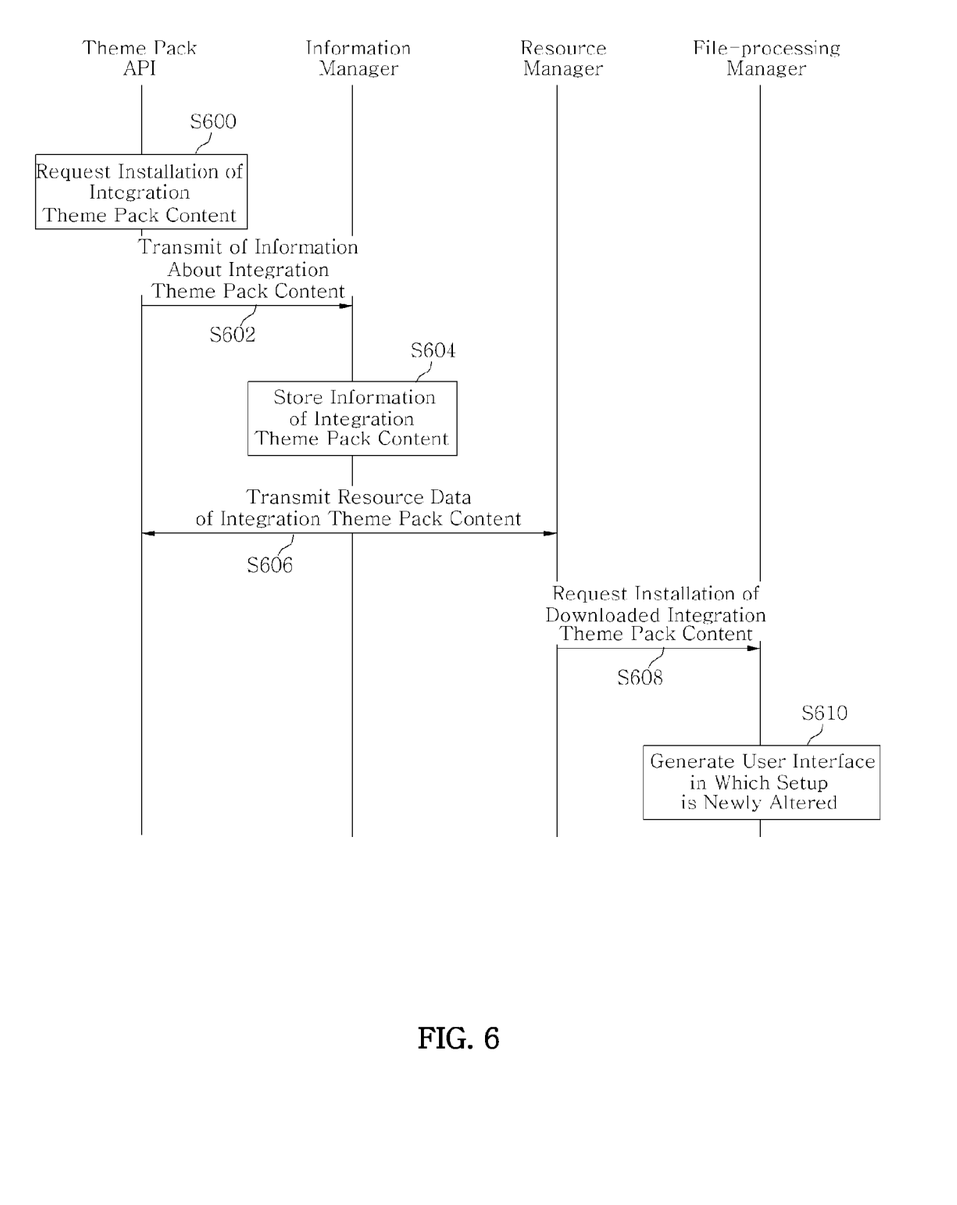
FIG. 6 is a ladder diagram illustrating a process of installing an integration theme pack content according to a preferred embodiment of the present invention.

FIG. 6 is a ladder diagram illustrating a process of installing the integration theme pack content according to the preferred embodiment of the present invention.

If a user operates the key input unit provided in the mobile communication terminal 100, and requests the installation of the integration theme pack content in which the setup of a user interface is to be altered, the theme pack API 422 of the theme pack manager 414 stored in the mobile communication terminal 100 handles the installation request of the integration theme pack content (S600).

The theme pack API 422 calls the information manager 416 to transmit information about the integration theme pack content (S602). The information manager 416 stores the information of the integration theme pack content received from the theme pack API 422 (S604). Then, the theme pack API 422 transmits resource data of the integration theme pack content stored in the program storage unit to the resource manager 418 (S606).

The resource manager 418 analyzes the hardware resources 432 of the mobile communication terminal to check hardware resources in which the integration theme pack content can be installed, decodes the integration theme pack content received from the theme pack API 422, temporarily stores the decoded integration theme pack content in the virtual area of the program storage unit, and requests the file-processing manager 420 to install the integration theme pack content (S608).

The file-processing manager 420 analyzes a user interface being currently displayed on the mobile communication terminal, separates the background screen image from the menu configuration image, loads the background screen image included in the integration theme pack content temporarily stored in the virtual area of the program storage unit, employs the background screen image as the background picture, overlaps the menu configuration image with the background screen image, transparently processes the overlapping portion, and applies ring tone and effect sound included in the integration theme pack content, thereby generating a user interface in which a setup has been newly altered (S610).

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

INDUSTRIAL APPLICABILITY

According to the present invention as described above, a user selects a background screen image displayed on a mobile communication terminal according to the preference of the user, causes a menu configuration image to be displayed on the background screen image, and transparently processes an overlapping portion. Accordingly, users can display their individual preferences more freely.

Further, since a mobile communication provider, in which the ensuring of mobile communication subscribers determines the success or failure of a business, provides a differentiated service in saturated communication markets as compared to a rival company, it is possible to ensure an advantageous position in collecting new mobile communication subscribers.

The invention claimed is:

1. A system for providing an integration theme pack service, the system comprising:
   a mobile communications terminal having a user interface;
   an integration theme pack service for customizing the user interface displayed on the mobile communications terminal;
   a wireless access network being a ground-based infrastructure for wirelessly exchanging data with the mobile communication terminal based on a predetermined protocol, and for relaying the integration theme pack service that is changeable according to a preference of the user,
   a mobile communication network including a set of communication equipment for providing voice telephone and data exchange services the mobile communications network configured to relay the integration theme pack service to the mobile communication terminal, and
   a content-providing server for providing the mobile communication terminal with an integration theme pack content for using the integration theme pack service:
   wherein the integrated theme pack service is configured to separate only a background screen image from the user interface displayed on the mobile communication terminal, and replace it with the integration theme pack content, wherein a portion of the integration theme pack content that overlaps with a menu configuration image, is at least semi-transparently processed and displayed.

2. The system as claimed in claim 1, wherein the integration theme pack content is configured according to genres of a content, and are provided as a package including a background screen image, ring tone and effect sound, collectively forming the user interface.

3. The system as claimed in claim 1, wherein the content-providing server is configured to generate the integration theme pack content by using still pictures and/or moving pictures uploaded from the mobile communication terminal, and is configured to provide the mobile communication terminal with the generated integration theme pack content.

4. A method for providing an integration theme pack service, which customizes a user interface displayed on a mobile communication terminal according to a preference of a user, in a system including a wireless access network, a mobile communication network and a content-providing server,
   the wireless access network being a ground-based infrastructure for wirelessly exchanging data with the mobile communication terminal based on a predetermined protocol, having handoff and radio resource management functions, and relaying the integration theme pack service in which the user interface of the mobile communication terminal is changeable according to the preference of a user,
   the mobile communication network being a set of communication equipment for providing voice telephone and data exchange services to a plurality of subscribers through a switching center, and relaying the integration theme pack service to the mobile communication terminal,
   the content-providing server providing the mobile communication terminal with an integration theme pack content necessary for using the integration theme pack service,
   the method comprising the steps of:
   (a) accessing the content-providing server;
   (b) downloading an interface manager from the content-providing server, for using the integration theme pack service;
   (C) receiving list information about the integration theme pack content so as to generate the integration theme pack content;
   (d) downloading the integration theme pack content, including:
      (d1) verifying integrity for the integration theme pack content;
      (d2) downloading the integration theme pack content after verifying the integrity in step (d1), and interworking with a parsing manager to decode the downloaded integration theme pack content; and
      (d3) storing the decoded integration theme pack content in the mobile communication terminal; and
   (e) installing the downloaded integration theme pack content.

5. The method as claimed in claim 4, wherein the step (c) includes the step of generating the integration theme pack content including a header, background screen image data, ring tone data, effect sound data and firmware data, the header denoting information about genres of a content, the background screen image data forming a background picture of the user interface of the mobile communication terminal, the ring tone data forming ring tone of the mobile communication terminal, and the effect sound data forming effect sound generated when the mobile communication terminal executes an application.

6. The method as claimed in claim 4, wherein the step (e) includes the sub-steps of:
   (e1) confirming genre information of the integration theme pack content;
   (e2) analyzing the user interface being currently displayed on the mobile communication terminal, and separating a background screen image from a menu configuration image; and
   (e3) replacing the background screen image with the menu configuration image, transparently processing a portion in which the integration theme pack content overlaps with the menu configuration image, and changing ring tone and effect sound having been set in the mobile communication terminal into the integration theme pack content.

7. A method for providing an integration theme pack service, which customizes a user interface displayed on a mobile communication terminal according to a preference of a user, in a system including a wireless access network, a mobile communication network and a content-providing server,
   the wireless access network being a ground-based infrastructure for wirelessly exchanging data with the mobile communication terminal based on a predetermined protocol, having handoff and radio resource management functions, and relaying the integration theme pack service in which the user interface of the mobile communication terminal is changeable according to the preference of a user, the mobile communication network being a set of communication equipment for providing voice telephone and data exchange services to a plurality of subscribers through a switching center, and relaying the integration theme pack service to the mobile communication terminal, the content-providing server providing the mobile communication terminal with an integration theme pack content necessary for using the integration theme pack service, the method comprising the steps of:

(a) accessing the content-providing server;

(b) downloading an interface manager from the content-providing server for using the integration theme pack service;

(c) receiving list information about the integration theme pack content so as to generate the integration theme pack content;

(d) downloading the integration theme pack content; and (e) installing the downloaded integration theme pack content, including:
  (e1) confirming genre information of the integration theme pack content;
  (e2) analyzing the user interface being currently displayed on the mobile communication terminal, and separating a background screen image from a menu configuration image; and
  (e3) replacing the background screen image with the menu configuration image, transparently processing a portion in which the integration theme pack content overlaps with the menu configuration image, and changing ring tone and effect sound having been set in the mobile communication terminal into the integration theme pack content.

8. The method as claimed in claim 7, wherein the step (c) includes the step of generating the integration theme pack content including a header, background screen image data, ring tone data, effect sound data and firmware data, the header denoting information about genres of a content, the background screen image data forming a background picture of the user interface of the mobile communication terminal, the ring tone data forming ring tone of the mobile communication terminal, and the effect sound data forming effect sound generated when the mobile communication terminal executes an application.

9. The method as claimed in claim 7, wherein the step (c) includes downloading an installer program with the interface manager; and wherein step (d) includes the sub-steps of:
  (d1) verifying integrity for the integration theme pack content that the installer program starts to download;
  (d2) downloading the integration theme pack content after verifying the integrity in step (dl), and interworking with a parsing manager to decode the downloaded integration theme pack content; and
  (d3) storing the decoded integration theme pack content in the mobile communication terminal.

\* \* \* \* \*